US 11,717,983 B2

(12) United States Patent
Weinmann

(10) Patent No.: US 11,717,983 B2
(45) Date of Patent: Aug. 8, 2023

(54) SAWING DEVICE

(71) Applicant: Weinmann Holzbausystemtechnik GmbH, St. Johann (DE)

(72) Inventor: Karl Weinmann, St. Johann (DE)

(73) Assignee: Weinmann Holzbausystemtechnik GmbH, St. Johann (DE)

( * ) Notice: Subject to any disclaimer, the term of this patent is extended or adjusted under 35 U.S.C. 154(b) by 71 days.

(21) Appl. No.: 17/296,736

(22) PCT Filed: Dec. 11, 2019

(86) PCT No.: PCT/EP2019/084718
§ 371 (c)(1),
(2) Date: May 25, 2021

(87) PCT Pub. No.: WO2020/120607
PCT Pub. Date: Jun. 18, 2020

(65) Prior Publication Data
US 2022/0024066 A1 Jan. 27, 2022

(30) Foreign Application Priority Data
Dec. 13, 2018 (DE) ...................... 10 2018 132 101.5

(51) Int. Cl.
*B27G 19/02* (2006.01)
*B23Q 3/06* (2006.01)
*B27B 27/10* (2006.01)

(52) U.S. Cl.
CPC ............ *B27G 19/02* (2013.01); *B23Q 3/069* (2013.01); *B27B 27/10* (2013.01); *Y10T 83/447* (2015.04); *Y10T 83/7734* (2015.04)

(58) Field of Classification Search
CPC ......... B27B 25/00; B27B 25/06; B27B 25/08; B27B 25/10; B27B 29/00; B23D 47/04;
(Continued)

(56) References Cited

U.S. PATENT DOCUMENTS

| 2,010,851 A | 8/1935 | Drummond |
| 4,938,111 A | 7/1990 | Masse |

(Continued)

FOREIGN PATENT DOCUMENTS

| CN | 105235029 A | 1/2016 |
| CN | 107738314 A | 2/2018 |

(Continued)

OTHER PUBLICATIONS

International Search Report dated Mar. 24, 2020 issued in PCT/EP2019/084718 (with English Translation).
(Continued)

*Primary Examiner* — Laura M Lee
(74) *Attorney, Agent, or Firm* — Collard & Roe, P.C.

(57) ABSTRACT

A sawing device, in particular for separating long workpiece parts, has a saw blade and a retaining device for separated workpiece parts, wherein the retaining device has a retaining element, at least on the side of the saw blade facing the workpiece part that is to be separated, which retaining element is arranged ahead of the saw blade in the machining direction of the workpiece and movably in such a way that it is movable from an inactive position above the workpiece into an active position which reaches ahead of the front end of the workpiece.

5 Claims, 1 Drawing Sheet

(58) Field of Classification Search
CPC . Y10T 83/732; Y10T 83/7734; Y10T 83/747; B23Q 3/002
USPC ............ 144/250.12, 250.13, 250.14, 250.18, 144/250.2, 250.26; 83/DIG. 1, 485, 614, 83/574
See application file for complete search history.

(56) References Cited

U.S. PATENT DOCUMENTS

| | | | |
|---|---|---|---|
| 5,918,521 A * | 7/1999 | Sartori | B23D 47/04 83/450 |
| 10,144,143 B2 | 12/2018 | Firth | |
| 10,144,144 B2 | 12/2018 | Firth | |
| 2010/0282039 A1 * | 11/2010 | Jan | B27G 19/08 83/440.2 |
| 2013/0298742 A1 | 11/2013 | Fuchs | |
| 2019/0187397 A1 | 6/2019 | Firth | |

FOREIGN PATENT DOCUMENTS

| | | |
|---|---|---|
| DE | 229211 C | 12/1910 |
| DE | 1046863 B | 12/1958 |
| DE | 102010041927 A1 | 4/2021 |
| EP | 0796707 A2 | 9/1997 |
| EP | 2178682 A2 | 4/2010 |
| GB | 710358 A | 6/1954 |

OTHER PUBLICATIONS

German Search Report dated Jul. 9, 2019 issued in DE 10 2018 132 101.5 (with English translation of relevant parts).

* cited by examiner

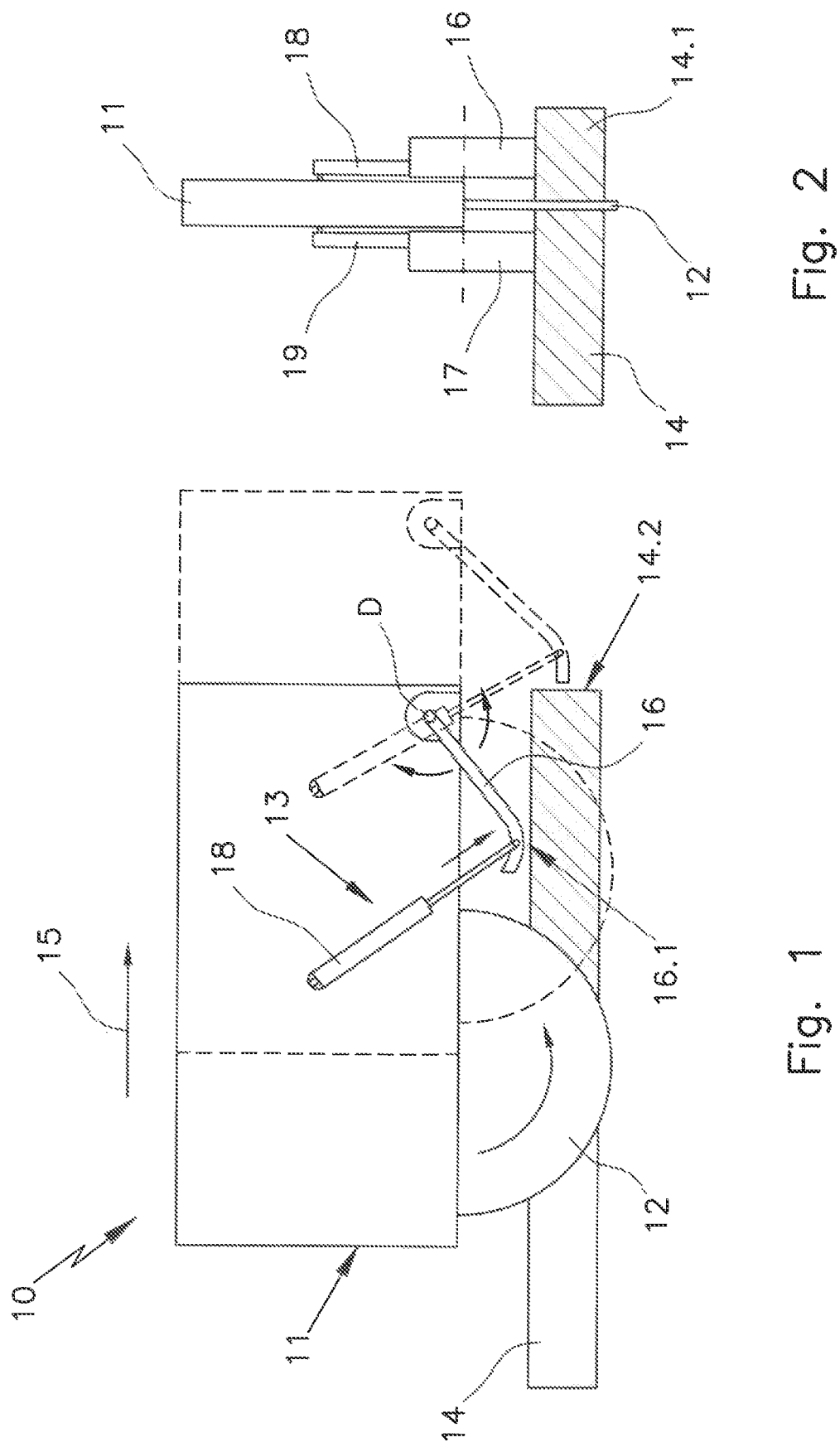

SAWING DEVICE

CROSS REFERENCE TO RELATED APPLICATIONS

This application is the National Stage of PCT/EP2019/084718 filed on Dec. 11, 2019, which claims priority under 35 U.S.C. § 119 of German Application No. 10 2018 132 101.5 filed on Dec. 13, 2018, the disclosures of which are incorporated by reference. The international application under PCT article 21(2) was not published in English.

BACKGROUND OF THE INVENTION

The invention relates to a sawing device, in particular for separating long workpiece parts, comprising a saw blade and a retaining device for separated workpiece parts.

In CNC machines having sawing devices, parts that have been separated from the workpiece can be accelerated by the saw blade and thrown out of the machine's work region. These ejected parts pose a significant danger to people in the vicinity of the machine. Retaining devices in the form of curtains are therefore usually provided on such CNC machines as splinter protection. In machines with large machining bridges for solid wood panels, impact walls are provided on the front sides of the machine's work table and are intended to hold back parts thrown out by the saw blade.

However, it has been shown that these safety measures are insufficient. In particular, long separated parts can easily break through protective curtains. The impact walls on the work table are firstly expensive and secondly ineffective in the case of bevel cuts and cuts perpendicular to the transport direction of the workpiece through the sawing device.

SUMMARY OF THE INVENTION

The object of the present invention is therefore to provide a sawing device having effective protection against parts being thrown out.

This object is achieved by a sawing device, in particular for separating long workpiece parts, comprising a saw blade and a retaining device for separated workpiece parts, which sawing device is characterized in that the retaining device has a retaining element, at least on the side of the saw blade facing the workpiece part that is to be separated, which retaining element is arranged ahead of the saw blade in the machining direction of the workpiece and movably in such a way that it is movable from an inactive position above the workpiece into an active position which reaches ahead of the front end of the workpiece.

In the sawing device according to the invention, the retaining device is arranged close to the saw blade and is already effective before the saw cut is completed. This means that separated workpiece parts are not accelerated or only slightly accelerated by the saw blade and therefore cannot pose a risk to people in the vicinity. The at least one retaining element can be moved in front of the front end of the workpiece even before the workpiece is completely severed by the saw blade. After separating the waste portion of the workpiece, it can be accelerated for a maximum of a few centimeters by the saw blade before it hits the retaining element. There is therefore at most a minimal acceleration of the waste portion, and therefore the retaining element does not have to be a heavy, solid component and can therefore be easily moved along with the sawing device.

The retaining device of the sawing device according to the invention is effective completely regardless of the direction of the saw cut. This makes it possible for the first time to provide reliable protection against flung waste portions, even with oblique or vertical saw cuts. With this protection, which is effective under all conditions, it is even possible to carry out manual work on the same workpiece during sawing.

It is advantageous if the retaining device has a retaining element on both sides of the saw blade. As a result of this symmetrical design of the retaining device, it is effective regardless of whether the waste portion of the workpiece is separated on the left or the right side of the workpiece.

In a preferred embodiment of the sawing device, the retaining element or elements may be pivotably arranged on the sawing device in such a way that they can be pivoted from an inactive position resting on the surface of the workpiece into an active position reaching ahead of the front end of the workpiece. By resting on the upper face of the workpiece, the retaining element or elements can easily detect the front end of the workpiece shortly before the saw blade reaches said front end. Of course, in addition to a pivotable arrangement of the retaining elements, a linearly displaceable arrangement of said elements is also possible.

Particular advantages are produced if the retaining element or elements can be automatically moved into their active position shortly before the saw blade reaches the front end of the workpiece. This can be achieved, for example, in that the at least one retaining element in its inactive position slides in a spring-loaded manner along the workpiece surface and, when the front end of the workpiece is reached, is moved downward by the spring force into its active position in front of the front end of the workpiece.

The retaining elements may be movable between their inactive and active positions for example by means of cylinder arrangements. At least the movement into the active position can take place automatically as described above. Of course, however, a sensor-controlled drive device may also be provided for the at least one retaining element.

The retaining element or elements may preferably be designed to be flap-like or slide-like.

Further advantages are produced if the retaining element or elements have a sliding surface by means of which they slide along the workpiece surface in their inactive position during sawing of the workpiece. As a result, they do not hinder the movement of the saw blade or the advance of the workpiece. It is further preferable if the sliding surface is a convex surface. This results in only linear contact between retaining element and workpiece surface, which further reduces mutual friction.

The invention also includes a machining apparatus for wood, metal, plastics or glass materials comprising a sawing device according to the invention. Said machining apparatus maybe part of a CNC machining center by means of which further machining of the workpiece is possible. The sawing device may preferably be used for machining beams or wall panels, but is not limited to these applications.

The invention also relates to a method for separating workpiece parts, in particular long workpiece parts, using a sawing device which comprises a saw blade and a retaining device, the retaining device having a retaining element, at least on the side of the saw blade facing the workpiece part that is to be separated, which retaining element is arranged ahead of the saw blade in the machining direction of the workpiece and movably in such a way that it is movable from an inactive position above the workpiece into an active position which reaches ahead of the front end of the workpiece, which method is characterized in that, before the start of the sawing process, the at least one retaining element is moved into its inactive position and, shortly before the complete separation of the workpiece part by the saw blade, is moved into its active position.

A preferred embodiment of a sawing device according to the invention is explained in more detail below with reference to the drawings, in which:

BRIEF DESCRIPTION OF THE DRAWING FIGURES

FIG. 1 is a schematic side view of a sawing device having a retaining device;

FIG. 2 is a view from behind of the sawing device from FIG. 1.

DETAILED DESCRIPTION OF THE INVENTION

FIG. 1 shows a sawing device 10 having a housing 11 for a saw blade 12. A retaining device 13 for separated parts 14.1 (FIG. 2) of a workpiece 14 is also arranged on the housing 11. In the example shown, the sawing device 10 moves in the direction of the arrow 15 over the workpiece 14, which is clamped on a work table (not shown). The direction of the arrow 15 therefore also indicates the machining direction of the workpiece 14. As can be seen, the retaining device 13 is arranged on the sawing device 10 ahead of the saw blade 12 in the machining direction 15 of the workpiece 14.

The retaining device 13 comprises a flap-like retaining element 16, 17 on both sides of the saw blade 12 that is arranged on the sawing device 10 so as to be pivotable about an axis D, as also shown in particular in the rear view from FIG. 2. Each retaining element is acted upon by a cylinder 18, 19, by means of which the retaining element 16, 17 can be pivoted from an inactive position indicated by solid lines in FIG. 1 into an active position shown by dashed lines and back. The retaining elements 16, 17 are in their inactive position until shortly before reaching a front end 14.2 of the workpiece, in which inactive position they rest on the upper face of the workpiece and slide along it.

In order to facilitate this sliding, the retaining elements 16, 17 are provided with a convex sliding surface 16.1, which is formed by a curved free end of the retaining elements 16, 17.

If the saw blade then approaches the front end 14.2 of the workpiece 14, the retaining elements 16, 17 are pressed by the cylinders 18, 19 into their active position, in which they reach ahead of the front end 14.2 of the workpiece 14. Therefore, after the workpiece 14 has been completely severed, the saw blade 12 cannot accelerate the separated part 14.1 (FIG. 2) and throw it out of the sawing device. Rather, the separated part 14.1 strikes the retaining element 16 and is held back by it.

Even with a stationary sawing device 10 and a moving workpiece 14, the retaining device 13 would fulfill the same safety function. In this case, the workpiece would be moved counter to the direction of the arrow 15 and the retaining elements 16, 17 would be moved, just before the workpiece 14 is severed, ahead of the front end 14.2 in the machining direction 15 of the workpiece 14, where they can hold back a workpiece part 14.1 accelerated by the saw blade 12.

What is claimed is:

1. A sawing device for separating long workpiece parts, comprising a saw blade (12) and a retaining device (13) for separated workpiece parts (14.1), wherein the retaining device (13) has a retaining element (16, 17) arranged on both sides of the saw blade (12), which retaining elements are designed in the form of a flap or a slide and are arranged ahead of the saw blade (12) in a machining direction (15) of the workpiece (14) and movably in such a way that each retaining element is movable from an inactive position above the workpiece (14) into an active position which reaches ahead of a front end (14.2) of the workpiece (14) during a sawing operation so as to prevent a separated workpiece part (14.1) from moving beyond an adjacent one of the retaining elements (16, 17),
    wherein each retaining element (16, 17) is connected to a cylinder arrangement that is configured to press the respective retaining element into the active position before the saw blade (12) reaches the front end (14.2) of the workpiece (14), and
    wherein each retaining element has a convex sliding surface (16.1) that slides along the workpiece surface in the inactive position during sawing of the workpiece (14).

2. The sawing device according to claim 1, wherein each retaining element (16, 17) is pivotably arranged on the sawing device (10) so as to be pivoted from the inactive position resting on the surface of the workpiece (14) into the active position reaching ahead of the front end (14.2) of the workpiece (14).

3. A machining apparatus for wood, metal, plastics, or glass materials comprising a sawing device according to claim 1.

4. The machining apparatus according to claim 3, wherein the machining apparatus is part of a CNC machining center.

5. A method for separating workpiece parts using a sawing device which comprises a saw blade (12) and a retaining device (13), the retaining device having a retaining element (16, 17) in the form of a flap or a slide arranged on both sides of the saw blade (12), and arranged ahead of the saw blade (12) in a machining direction (15) of the workpiece (14) and movably in such a way that each retaining element is movable from an inactive position above the workpiece (14) into an active position which reaches ahead of a front end (14.2) of the workpiece (14), wherein, before the start of a sawing process, each retaining element (16, 17) is moved into the inactive position by means of cylinder arrangements and, during the sawing process slides on top of the workpiece with a convex sliding surface and before complete separation of a workpiece part (14.1) by the saw blade (12), is pressed into the active position by the cylinder arrangements so as to prevent the separated workpiece part from moving beyond an adjacent one of the retaining elements.

* * * * *